United States Patent [19]
Lesher

[11] 3,708,088

[45] Jan. 2, 1973

[54] APPARATUS FOR METERING LIQUID FLOW DISCHARGE

[75] Inventor: Elroy W. Lesher, Reading, Pa. 19605

[73] Assignee: Albany International Corp., Albany, N.Y.

[22] Filed: Nov. 20, 1970

[21] Appl. No.: 91,480

[52] U.S. Cl. .....................222/70, 164/309, 222/394
[51] Int. Cl. ..............................................B22d 37/00
[58] Field of Search........222/DIG. 12, DIG. 15, 394, 222/70; 164/136, 309

[56] References Cited

UNITED STATES PATENTS

| 3,448,898 | 6/1969 | Bernette | 222/DIG. 12 |
| 3,399,808 | 9/1968 | Bucy | 222/DIG. 12 |
| 2,743,492 | 5/1956 | Easton | 222/DIG. 15 |

FOREIGN PATENTS OR APPLICATIONS 718,744   11/1954   Great Britain.......................164/309

Primary Examiner—Samuel F. Coleman
Assistant Examiner—David A. Scherbel
Attorney—David S. Kane, Daniel H. Kane, Philip T. Dalsimer, Joseph C. Sullivan, John Kurucz, James J. Salerno, Jr., Martin E. Goldstein, Charles R. Hoffmann, Gerald Levy, Charles P. Bauer, Peter Saxon and Peter C. Van Der Sluys

[57] ABSTRACT

Apparatus for repetitively dispensing predetermined equal amounts of liquid metal from a container under uniform pressure in which the time of actual discharge from the container is maintained constant by detecting the initiation of discharge and terminating pressure application at a fixed time interval after initiation of discharge.

3 Claims, 3 Drawing Figures

APPARATUS FOR METERING LIQUID FLOW DISCHARGE

BACKGROUND OF THE INVENTION

The present invention relates to an improved system and method for dispensing liquid, such as molten metal, in repetitively accurate equal amounts into a suitable mold. In the mass production of castings made either in molds or in die casting machines, it is required to supply repeatedly accurate predetermined amounts of metal at the proper temperature and in short periods of time. Where all the castings are identical, the volume of metal delivered to the successive molds must be equal.

With each discharge, the level of the metal mass inside the container, such as a melting or holding furnace, decreases in volume by an amount corresponding to the mass dispensed during the preceding discharge. Heretofore, in order to dispense equal quantities during successive discharges, it has been necessary to adjust either the cycle time or the applied pressure to compensate for the increase in height to which the metal level must be raised from its ambient level to the level of discharge.

DESCRIPTION OF THE PRIOR ART

The system of the present invention is similar to existing systems for dispensing molten metal to molds in that inert gas under pressure is introduced at the top of a closed vessel to displace the liquid from the vessel through an outlet passage into a mold. A major problem encountered in the prior art's use of a sealed vessel immersed in molten metal has been that the total cycle time must be accurately increased per each successive discharge of an equal volume of metal under constant pressure conditions. Increased time is necessary to compensate for the additional height the molten metal must be raised to reach the same discharge level because the liquid level of the reservoir drops lower upon each successive discharge.

Alternatively, it has also been proposed to maintain a constant time during which gas pressure is applied and increase the gas pressure applied for each successive discharge; see, for instance, Doyen, U.S. Pat. No. 2,244,490, issued June 3, 1941.

A typical constant pressure system included a metal melting furnace having means for automatically ladling a predetermined amount of metal from a chamber within the melting furance. Gas pressure is then used to cause molten metal discharge through a discharge channel located within the chamber. Control of the gas pressure for the time necessary to discharge the predetermined amount of molten metal was achieved by positioning a float within the chamber such that its position varied in accordance with the level of the molten metal. Actuating means interconnecting the float and gas pressure pump varied the time of gas pressure application in accordance with the molten metal level as determined by the float. The actuating means made use of a circuit including a timer responsive to the level of the molten metal in the chamber for automatically terminating the operation of the pump after a period of time determined by the setting of the timer and the level of the molten metal; see, for example, Tama, U.S. Pat. No. 2,937,789, issued May 24, 1960.

Another constant pressure system monitored the rate of flow of discharging metal and compared this against reference signals in order to make adjustments through the use of complicated and expensive electrical circuitry; see, for example, Hibbard, U.S. Pat. No. 3,465,916, issued Sept. 9, 1969.

It is the primary object of this invention to provide a simple and inexpensive dispensing apparatus to repetitively dispense equal amounts of liquid metal.

It is a further object of this invention to provide a circuit control employing a simple timer mechanism which controls the preset time fluid pressure must be maintained to dispense a desired amount of liquid, which timer is activated by the start of liquid discharge.

It is a further object of this invention to provide a simplified dispensing apparatus which allows metal flow alternately in and out of a single opening.

It is a further object of this invention to provide a dispensing system and method of metering repetitive equal discharges of liquid metals including molten liquid metals.

SUMMARY OF THE INVENTION

In the instant invention, an enclosed vessel is partially immersed in the liquid to be discharged, such as molten metal. This vessel has an opening above the liquid level through which a pressurized gas is introduced or exhausted under valve control. The vessel further has a liquid inlet located substantially below said liquid level through which liquid enters and at least partially fills the vessel. This liquid inlet further functions as a valve seat which engages the bottom end of a movable discharge tube. After liquid enters said vessel, the discharge tube is moved into a first position to seal the vessel liquid inlet. Pressurized gas is then introduced through the vessel opening which causes discharge of the liquid through an orifice end of the discharge tube. Since substantially equal pressure is applied during a discharge state and since the internal dimensions of the hollow vessel and the discharge tube are known, a predetermined substantially constant flow rate is achieved. A liquid sensor adjacent the discharge orifice is used to electrically signal when the liquid is first starting to discharge from the orifice. This pour start signal initiates operation of a timing circuit which is preset to correspond with the known time it takes to discharge a predetermined amount of liquid under constant discharge pressure conditions from a given reference point, i.e. the discharge orifice. Upon timing out of the timer, halt control signals are generated which cause the valve control to exhaust the pressurized gas and further to unseat the discharge tube from blocking the vessel inlet. Thus, liquid discharge is halted by removing the discharge pressure and by disconnecting the discharge path of flow. Simultaneously, liquid can refill the vessel by flowing through the now open vessel inlet in preparation for the next cycle of discharge. Thus, a simple timer activated by the first metal to flow from the discharge orifice controls the duration of the discharge condition in an accurate manner. A simplified design employing a movable discharge tube allows a single vessel valve inlet to act as both a liquid inlet and outlet.

BRIEF DESCRIPTION OF THE DRAWINGS

Other features of the invention will become apparent from the following more detailed description and from the accompanying drawings, in which.

DESCRIPTION OF THE PREFERRED EMBODIMENT

Figure 1:
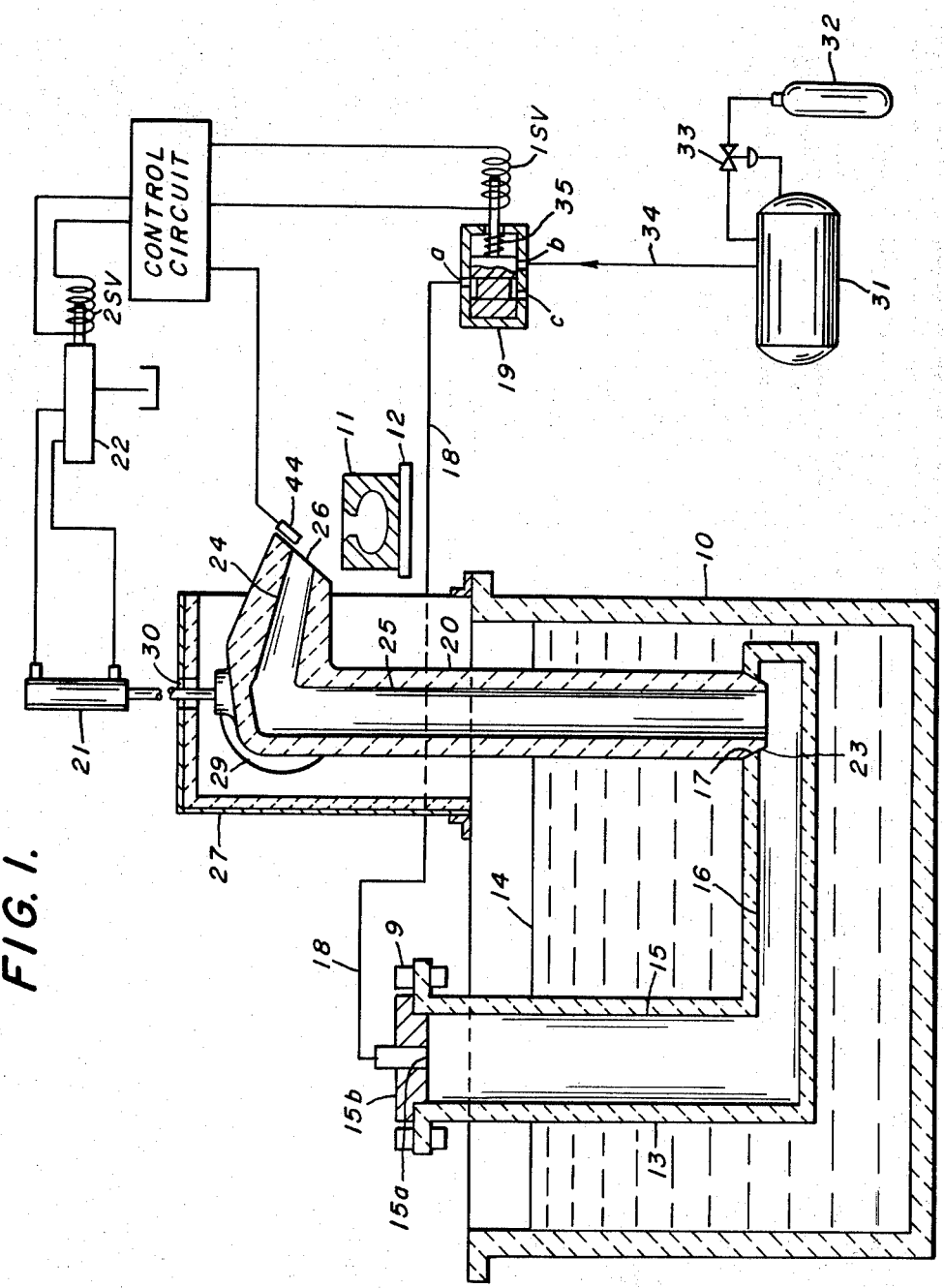
FIG. 1 is a view in vertical section of the apparatus of the invention disposed in a holding pot or furnace containing molten metal.

The purpose of the invention shown in FIG. 1 is to repetitively discharge equal volumes of metal from a holding container 10 into each mold 11 passing by on a conveyor means 12 by use of metal dispensing apparatus partially submerged in the liquid metal within the container.

The metal dispensing apparatus consists of a vessel 13 partially submerged in molten metal 14 held by container 10. Vessel 13 consists of two hollow interconnected chambers 15 and 16. Fixed supports 9 located above the container 10 mount the vessel 13. Chamber 15 functions as a holding chamber which extends slightly above the molten metal level. A top opening 15a is provided in flanged top 15b mounted on holding chamber 15 which communicates with a pressurized fluid line 18 with fluid entrance and evacuation controlled by solenoid valve 19. Interconnected generally horizontal chamber 16 of the vessel has a tapered valve seat inlet 17 located adjacent an end remote from the interconnection of chambers 15 and 16. The location of valve seat inlet 17 allows metal 14 to enter through the top of chamber 16. By locating the valve inlet substantially below the metal level in the container 10 slag, which frequently forms on the surface of the metal, does not enter the dispensing apparatus.

Figure 2:
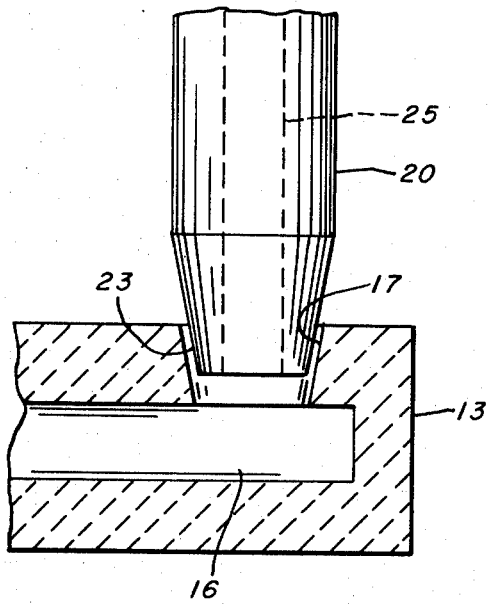
FIG. 2 is a partial view in vertical section of the discharge tube and of the FIG. 1 vessel inlet apparatus in an open inlet position.

Means defining a discharge channel in the form of a vertically movable discharge tube 20 is partially submerged in the metal 14. A two-way air piston 21 under the control of a conventional solenoid valve 22 is connected to the top of the tube 20 and moves the tube between an operative seated condition (FIG. 1) and an inoperative condition (FIG. 2). The discharge tube has a tapered inlet end 23 which engages the tapered valve seat inlet 17 to seal the vessel. A short downwardly inclined discharge channel 24 interconnects the vertical passage 25 within the tube at its top. The open end of channel 24 defines a pouring orifice 26 through which metal exists from the discharge tube to be caught by each conveyor mounted mold.

To prevent metal solidification or build-up in the discharge portion of the tube above the metal level, the upper end of the discharge tube is enclosed in an insulating refractory-lined housing 27 in which are two gas burners (not shown) blowing through opposed side wall housing holes 29. The gas burners maintain at least a minimum melting temperature in the upper area of the discharge tube. An opening 30 through the top of the housing is provided to allow entrance of the piston rod of air piston 21. Enough clearance is provided between the housing top and the top of the discharge tube to allow the vertical reciprocation previously set forth. The refractory housing is three sided with an open fourth side to the right of FIG. 1 to allow the projection of discharge channel 24 over the mold 11. Other means, such as an electric resistance coil (not shown), could also be employed to heat the upper portion of the discharge tube.

Both discharge tube 20 and vessel 13 can be made of a graphitic or other refractory material resistant to attack by molten metal. Excellent results were obtained in the preferred embodiment with the use of a cast material comprising a silicon-nitride-bonded silicon carbide to form the vessel and discharge tube.

The above-described dispensing apparatus functions to automatically dispense predetermined successive volumes of liquid metal. The cycle of operation starts after metal has been allowed to enter the vessel through the valve inlet 17 as shown in FIG. 2. A control circuit (to be later described) upon receiving a signal that a mold 11 is in a metal receiving position generates two successive cycle control signals, the first of which signals energizes solenoid 2SV which causes solenoid valve 22 to operate air piston 21 to move the discharge tube to the position shown in FIG. 1 to seal valve inlet 17. The second of said cycle control signals causes fluid control solenoid valve 19 to effect fluid pressurization of chamber 15. In the preferred form, the fluid used is pressurized gas stored in tank 31. Connected to tank 31 is a high pressure gas container 32. A high pressure reducing valve 33 in the line between tank 31 and container 32 maintains a constant pressure in tank 31. A gas line 34 connects tank 31 with an inlet port $b$ of valve 19. The second cycle control signal causes a solenoid 1SV to overcome the resistance of spring 35 and move the valve spool from the position shown in FIG. 1 to the right, thereby blocking exhaust port $c$ and allowing gas communication between ports $a$ and $b$ thereby pressurizing the vessel. Gas evacuation of vessel 13 occurs when solenoid 1SV is deenergized (as later explained), thereby allowing spring 35 to return the valve spool to the left closing port $b$ and exhausting gas from port $a$ through port $c$.

Generally an inert compressed gas is employed for molten zinc and aluminum such as nitrogen or dry air. For molten magnesium, a gas that is substantially free of water vapor is preferred.

Introduction of gas under constant pressure to the vessel chamber 15 forces the liquid metal inside the vessel to flow at a uniform rate out of discharge orifice 26 where it is captured by mold 11. An electrode element 44 mounted adjacent the discharge orifice detects the start of liquid flow therefrom and generates a first signal causing a timer in the circuit control means to run a preset time needed to dispense the predetermined desired volume under constant gas pressure discharge. The manner in which the first signal representative of a pour start condition is generated is explained more fully in connection with the detailed explanation of the circuit of FIG. 3.

When the said timer times out at the end of the preset time, halt control signals are sent deenergizing solenoids 1SV and 2SV thereby venting gas pressure through port $c$ of solenoid valve 19 and raising discharge tube 20 to the inactive FIG. 2 position. Metal then enters the vessel through valve inlet 17 to refill the chambers in preparation for the next cycle of operation.

DETAILED CIRCUIT SCHEMATIC

Figure 3:
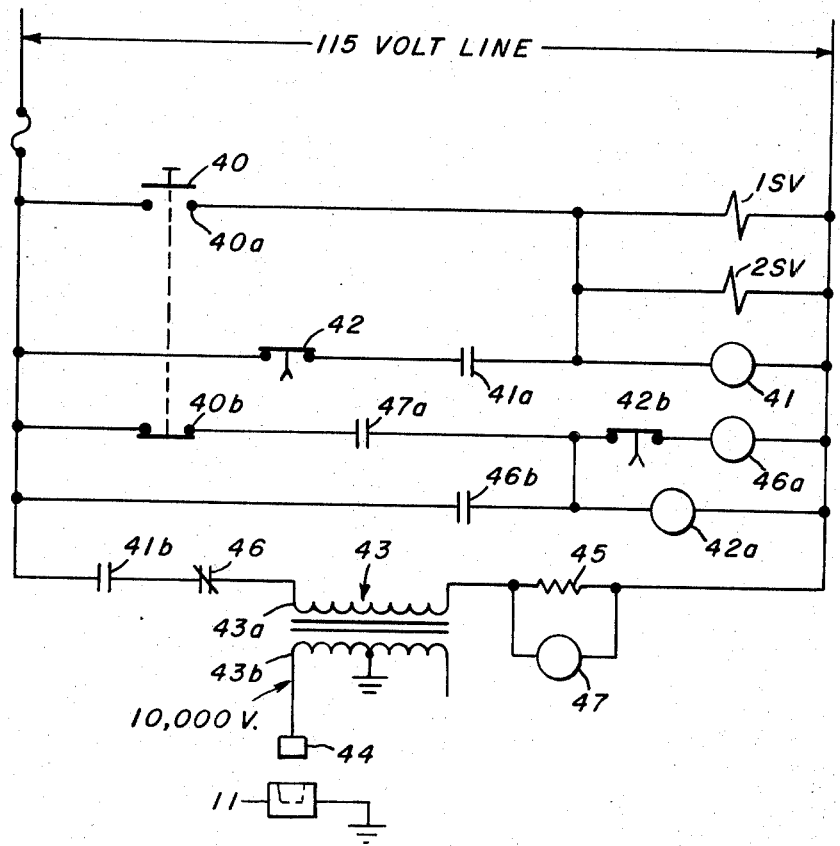
FIG. 3 is a detailed circuit schematic partially in block form of the FIG. 1 control system.

FIG. 3 illustrates a detailed schematic of the control circuit of FIG. 1 and represents the circuit in the inactive state. Depression of push button 40 by the operator or by a mold passing into a liquid catching position energizes the circuit from a 115 volt line power source. Depression of push button 40 closes normally open push button contact set 40a, thereby energizing a first control relay 41, first solenoid 1SV and second solenoid 2SV which are connected in parallel. Energizing control relay 41 closes normally open first control relay contact set 41a, thereby energizing a holding circuit to maintain control relay 41 and the solenoids 1SV and 2SV energized when the push button 40 returns to its open position. (It should also be noted that depression of push button 40 momentarily opens normally closed push button contact set 40b which set again closes upon release of the push button.)

It will be recalled that energization of solenoids 1SV and 2SV cause the vessel to be pressurized and the discharge tube to be moved to close the vessel valve inlet.

Energization of first control relay 41 closes normally open first control relay contact set 41b, thereby allowing current to flow through a normally closed second control relay contact set 46 in order to energize transformer 43.

Energization of the primary windings 43a of the transformer causes a 10,000 volt potential in the secondary windings 43b. Electrode element 44 is connected to one end of the secondary windings 43b with the other end grounded.

Since the gas pressure solenoid 1SV has been energized, liquid metal begins to flow from the discharge orifice. This metal flow is detected by the energized electrode element 44 located adjacent the discharge orifice. Metal flow causes the voltage potential at the electrode element to arc to the molten metal (ground potential), thereby causing a short circuit in the transformer 43. Arcing of the electrode element acts as a first control signal representative of the start of metal dispensing time. The short circuit current provides a 6 volt drop across a 5 ohm resistor 45 in series with the transformer's primary windings. A third control relay 47 which is in parallel with the resistor 45 is thus energized thereby closing normally open third control relay contact 47a. Current thus passes through closed push button contact set 40b and relay contact set 47a and a normally closed timer delay relay contact set 42b to energize second control relay 46a.

A preset timer delay relay 42a in parallel with the second control relay 46a is also energized.

This timer delay relay has been preset for the predetermined time it takes to dispense the desired volume of molten metal needed to fill the conveyor mold. Energization of second control relay 46a causes normally open second control relay contact set 46b to become closed, thereby maintaining a holding circuit for the timer delay relay 42a and the second control relay 46a. This holding circuit is necessary because energization of second control relay 46a causes normally closed second control relay contact set 46 to open, thereby deenergizing the transformer 43 to stop electrode element arcing. This drops out third control relay 47, thereby causing third control relay contact set 47a to return to its normally open condition.

At this time, the circuit is under the control of the delay relay 42a. At the end of the preset time, the timer times out causing time delay relay contacts 42 and 42b to open. Opening of time delay relay contact set 42b deenergizes second control relay 46a thereby opening second control relay contact set 46b and closing second control relay contact set 46.

Opening of timer delay relay contact set 42 causes deenergization of first control relay 41, thereby opening the first control relay contact set 41a and first control relay contact set 41b. Thus it can be seen that opening of the contact sets 42 and 42b functions as a second signal in the form of a halt control signal which deenergizes the gas valve solenoid 1SV and the air valve solenoid 2SV which causes stoppage of metal dispensing. Deenergization of the second control relay 46a by opening of timer contact set 42b causes second control relay contact set 46b to open, thereby deenergizing timer delay relay 42a. Deenergizing relay 42a closes the timer delay relay contact sets 42 and 42b.

Metal from the reservoir once again enters the vessel valve inlet as the discharge tube was moved to the position shown in FIG. 2 by deenergization of solenoid 2SV. The control circuit is again in the inactive state shown in FIG. 3 in readiness for the next cycle of metal dispensing.

While switch 40 is described above for simplicity as manually actuated, in practice it will be normally actuated to its closed position automatically as each mold 11 is moved into metal receiving position.

In summary, an apparatus for liquid dispensing from a sealed vessel is provided which has a cycle of operation requiring the sealing of the only liquid inlet to the vessel with a movable discharge channel defining means; displacing the liquid in the vessel by use of pressurized fluid being introduced to the vessel to force the liquid through an orifice of the discharge channel; generating a first signal by means of the electrode element 44 and the circuit already described which signal is a function of the start of the liquid pouring through the discharge orifice; maintaining liquid discharge for a preset time measured by a timer being energized so that a second signal which is a time delay signal representative of the preset time needed to discharge the desired amount of liquid is generated; and relieving the gas pressure on the liquid when the second signal is generated by causing solenoid means to evacuate pressurized gas from the vessel and to move the discharge channel from engagement with the vessel inlet, such movement of the discharge channel allowing the vessel to again be refilled with liquid metal.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. Apparatus for repetitively dispensing a predetermined amount of liquid metal for use with a metal melting furnace comprising a vessel defining a chamber to hold liquid metal, said vessel being partly submerged in a container of the liquid to be discharged, said chamber having a liquid inlet below the level of the liquid in said container through which liquid enters to at least partially fill said chamber, means defining a discharge channel disposed adjacent and in fluid communication with said chamber, said discharge channel having a pouring orifice at one end remote from said chamber, and said discharge channel defining means partly immersed in said liquid, means applying a uniform fluid pressure to a surface of said liquid metal in said chamber to cause the liquid metal to be discharged from said chamber through said discharge channel, a pour flow detector means positioned adjacent said pouring orifice for detecting the presence of liquid metal discharging from said orifice, actuating means operatively connected to said pour flow detector means and responsive to the start of liquid metal discharge from said orifice as sensed by said pour flow detector means for causing said fluid pressure applying means to maintain metal discharge only for a preset time interval through said orifice, thereby discharging a predetermined amount of liquid metal from said chamber regardless of the initial level of the liquid metal in said chamber, said discharge channel having an inlet end which, in one position, engages and precludes liquid flow between said container and said vessel through said chamber inlet while establishing liquid communication between said chamber and said discharge channel and, in a second position, is remote from and opens said chamber inlet to liquid flow from said container, and means for moving said discharge channel defining means between said first and second positions.

2. The apparatus as recited in claim 1 wherein said actuating means further comprises cycle control means for generating two successive cycle control signals, the first of said cycle control signals causing said means for moving said discharge channel to place said discharge channel in said first position, and the second of said cycle control signals causing said fluid pressure applying means to pressurize said chamber, thereby forcing liquid through said discharge channel.

3. A liquid metal dispensing apparatus for use with a holding pot containing liquid metal comprising:
 a. an enclosed vessel that is partially submerged in the liquid metal, said vessel having means defining a gas opening above the liquid metal level, said vessel having a valve seat inlet located below said liquid level through which liquid metal enters to at least partially fill said vessel;
 b. means defining a movable discharge tube partially immersed in said liquid metal, said discharge tube having an inlet end which communicates with and seals said vessel inlet to metal influx in one position and is remote therefrom in a second position, said discharge tube having a discharge orifice remote from said inlet end; and
 c. means for moving said discharge tube between said first and second positions.

* * * * *